(12) United States Patent
Muhr

(10) Patent No.: US 6,698,137 B2
(45) Date of Patent: Mar. 2, 2004

(54) SEED INOCULATION SYSTEM

(76) Inventor: Blaine Muhr, Box 71, Francis Saskatchewan (CA), S0G 1V0

(*) Notice: Subject to any disclaimer, the term of this patent is extended or adjusted under 35 U.S.C. 154(b) by 0 days.

(21) Appl. No.: 09/994,737

(22) Filed: Nov. 28, 2001

(65) Prior Publication Data

US 2002/0104262 A1 Aug. 8, 2002

(30) Foreign Application Priority Data

Feb. 5, 2001 (CA) .............................................. 2333834

(51) Int. Cl.[7] .............................. A01C 1/06; A01C 21/00
(52) U.S. Cl. ................ 47/57.6; 47/DIG. 9; 47/DIG. 11; 47/1.5; 71/5; 111/74; 111/118; 111/130; 428/403; 428/15; 504/100; 401/4
(58) Field of Search ..................... 47/57.6, 1.5, DIG. 9, 47/DIG. 11; 71/5; 428/403, 15; 435/185, 93; 504/100; 111/74, 118, 130; 401/4

(56) References Cited

U.S. PATENT DOCUMENTS

| | | | | |
|---|---|---|---|---|
| 1,718,332 A | * | 6/1929 | Cloer | |
| 2,200,107 A | * | 5/1940 | Weitz | |
| 2,579,734 A | * | 12/1951 | Burgesser | |
| 3,616,573 A | * | 11/1971 | Clifford | |
| 4,238,523 A | * | 12/1980 | Porter et al. .................. 427/4 |
| 4,303,417 A | * | 12/1981 | Koch .............................. 55/96 |
| 4,315,380 A | * | 2/1982 | Davidson ....................... 47/58 |
| 4,356,934 A | * | 11/1982 | Knake .......................... 221/96 |
| 4,631,860 A | * | 12/1986 | Broughton ..................... 47/58 |
| 5,593,948 A | * | 1/1997 | Lisa et al. .................... 504/324 |
| 5,632,819 A | * | 5/1997 | Geissler ....................... 118/712 |
| 5,750,466 A | * | 5/1998 | Wedegaertner et al. ..... 504/100 |
| 5,891,246 A | * | 4/1999 | Lund ............................ 118/13 |
| 6,202,346 B1 | * | 3/2001 | Lyons et al. .................. 47/57.6 |

FOREIGN PATENT DOCUMENTS

| | | | | |
|---|---|---|---|---|
| DE | 3840260 A1 | * | 11/1988 | ............ A01C/1/08 |
| DE | 4309729 A1 | * | 3/1993 | ............ A01C/1/08 |
| FR | 2593663 A1 | * | 1/1986 | ............ A01C/1/08 |
| FR | 261804 | * | 6/1987 | ............ A01C/1/06 |

* cited by examiner

Primary Examiner—Peter M. Poon
Assistant Examiner—Andrea M. Valenti
(74) Attorney, Agent, or Firm—Ryan W. Dupuis; Adrian D. Battison; Michael R. Williams

(57) ABSTRACT

A seed treating apparatus used to inoculate and treat seeds, which consists of a portable tank, pump, valve and nozzle system. This system can be mounted on any agricultural hauling vehicle or seeding implement to apply inoculant to seeds before or during the planting process. On a seeder having a transfer duct with a feed hopper at one end for receiving seed from a supply, the spray nozzle is mounted above the duct for spraying the material into the seed as it enters the hopper.

8 Claims, 5 Drawing Sheets

SEED INOCULATION SYSTEM

BACKGROUND OF THE INVENTION

Seed treating mechanisms are commonly used by grain growers to cover the surface of seed with fertilizer or enzymes before planting. Seed treaters in prior art generally use a storage unit like a hopper until transferred to the field for treating seeds in batches. Mechanisms used in the prior art thus generally involve storage of left over treated seeds. Storage of treated grain poses a health risk to workers and may cause possible accidental mixing into grain intended for consumption.

Prior art, which typically involves the use of powders for inoculation, has not addressed the exposure of potentially harmful treatment chemicals to the operator on a windy day. Also the prior art has not solved the cleansing problem in which the operators are exposed to potentially harmful chemicals during this cleansing process.

SUMMARY OF THE INVENTION

In light of the previous disadvantages known to the current seed treating devices now present in prior art, the present invention solves most of inadequacies of that prior art.

The present design makes use of liquid inoculent, which reduces the risk of floating powders on a windy day.

This method which may be used on the final seed-treating implement, eliminates the mess that previously was left in the hopper or other mixing device.

The only residue possible would be contained to the actual seeder implement and seed treater itself. The seed treater can be cleaned easily by rinsing out with water and adding −40° C. washer fluid to keep from freezing.

The seed treater is designed to uphold efficient operation thereby reducing operator cost and chemical exposure. This seed treater eliminates further inefficiencies by allowing the worker to treat only the amount of grain required for immediate planting.

The present invention is simple in design and composed of available, inexpensive materials, allowing low cost of manufacture and low cost to the consumer. This device is therefore easily and inexpensively repaired or replaced for longer and economical use.

The operation is as efficient as pouring the inoculent/seed treatment into the tank and turning the power on. The pump and nozzle combination sprays the fluid into the moving seed at the grain intake of the air seeder operation. This innovation can be also used as a sprayer for ATV spraying.

Also, the seed treater can be quickly mounted on any air seeder implement or truck box.

It is one object of the present invention to provide a seed inoculation system.

According to a first aspect of the present invention there is provided a seed inoculation system for a transfer duct having an inlet hopper for transporting seeds from a supply of seeds, the system comprising:

a tank for receiving a liquid inoculant material;

a pump for discharging the material from the tank;

a flexible hose for receiving the pumped material;

a rigid wand connected to an end of the hose; and a spray nozzle connected to an end of the wand for spraying the material into a flowing mass of the seed to be inoculated.

The spray nozzle is preferably arranged to be mounted above the duct so as to spray the material into the seed as it enters the hopper.

The spray nozzle may be arranged to be mounted by the rigid wand so as to spray the material generally parallel to the duct.

The spray nozzle is also preferably arranged to spray in a fan pattern in a plane at right angles to the flow into the hopper.

A manually operable flow control valve may be provided at the wand.

An agitator may be provided on the tank for circulating contents of the tank. The agitator preferably comprises an agitator valve connected between an outlet of the pump and the tank for circulating a portion of contents of the tank through the pump and back into the tank.

According to a second aspect of the present invention there is provided a seed inoculation system comprising:

a seeder having a seed tank and a plurality of seeding elements;

a transfer duct for transporting the seeds from a supply to the seed tank;

an inoculant tank for receiving a liquid inoculant material;

a pump for discharging the material from the tank;

a flexible hose for receiving the pumped material;

a rigid wand connected to an end of the hose;

and a spray nozzle connected to an end of the wand for spraying the material into a flowing mass of the seed at the transfer duct to be inoculated.

The duct preferably comprises an auger tube.

When the duct includes a hopper, the spray nozzle is preferably mounted by the rigid wand so as to spray the material into the hopper.

The spray nozzle is preferably mounted above the duct so as to spray the material into the seed as it enters the hopper.

Preferably the spray nozzle is arranged to spray in a fan pattern in a plane at right angles to the flow into the hopper.

The spray nozzle may be mounted by the rigid wand so as to spray the material generally parallel to the duct.

The duct is preferably mounted on the seeder for receiving the seed from a supply truck.

The hose is preferably flexible so as to allow folding of the duct relative to the seed tank.

The inoculant tank is preferably mounted on the seeder when the duct is mounted on the seeder.

According to a further aspect of the present invention there is provided a method of seed inoculation comprising:

providing a transfer duct having an inlet hopper for transporting the seeds from a supply;

providing an inoculant tank for receiving a liquid inoculant material;

providing a pump for discharging the material from the tank;

providing a flexible hose for receiving the pumped material;

providing a rigid wand connected to an end of the hose;

providing a spray nozzle connected to an end of the wand and spraying the material into a flowing mass of the seed as it enters the hopper at the transfer duct.

The method preferably includes mounting the spray nozzle above the duct and spraying the material into the seed as it enters the hopper.

The method may also include mounting the spray nozzle the rigid wand so as to spray the material generally parallel to the duct.

BRIEF DESCRIPTION OF THE DRAWINGS

Embodiments of the invention will now be described in conjunction with the accompanying drawing, in which.

In the drawings like characters of reference indicate corresponding parts in the different figures.

DETAILED DESCRIPTION

Figure 1:
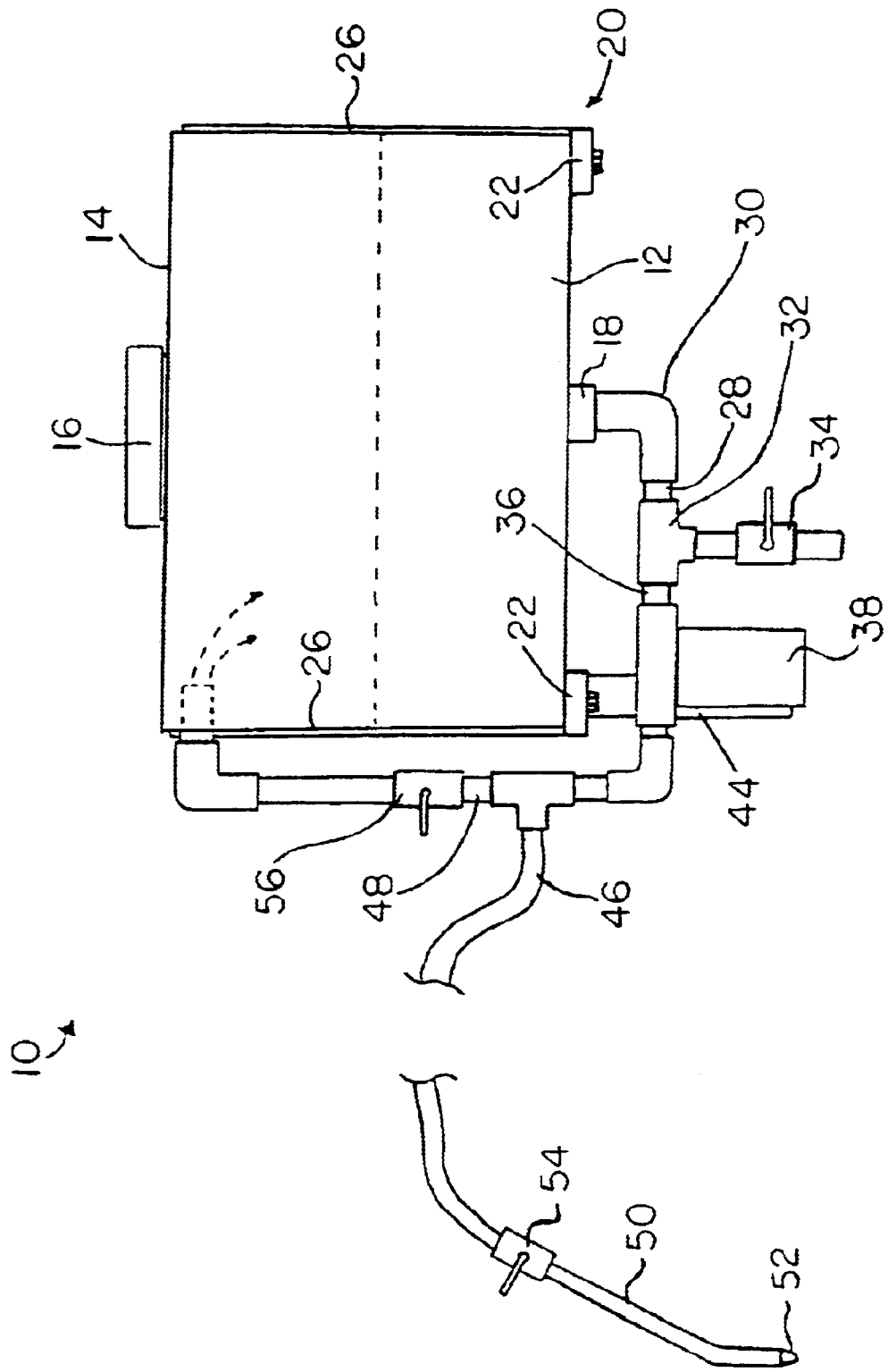
FIG. 1 is a schematic front elevational view of a seed inoculation system according to the present invention.

Referring to the accompanying figures there is illustrated a seed inoculation system generally indicated by reference numeral 10. The system 10 is arranged for inoculation of seeds using a liquid inoculant.

The system includes a tank 12 which is generally rectangular, being molded of plastic and having a nine gallon capacity. The tank 12 is formed of suitable material for containing the potentially harmful chemicals used for seed inoculation.

The tank includes a product fill hole in a top side 14 thereof which includes a cap 16 for enclosing the product fill hole. The cap 16 is threadably secured over the product fill hole in the top side of the tank to permit removal thereof for filling the tank by pouring liquid inoculant through the open product fill hole.

The tank 12 also includes a drain opening 18 in a bottom side of the tank in communication with the lowest point of the tank for draining contents of the tank therethrough.

The tank 12 is supported on a steel frame 20 which includes a pair of bottom rails 22 spanning horizontally across the bottom of the tank 12 at opposite ends of the tank. The rails 22 support the tank thereon, with the tank being secured to the rails by suitable fasteners.

The frame 20 also includes a rear support 24 secured to the rails 22, perpendicularly to the rails, spanning a back side of the tank 12. The rear support includes suitable mounting apertures therein for mounting the tank supported on the bottom rails 22 on a suitable vertical supporting surface such as a frame member of a seeder or truck.

The steel frame 20 also includes a pair of straps 26 which span between the rear support 24 and the respective bottom rails 22 at opposite ends of the tank 12.

A clear drain line 28 is coupled to the drain opening 18 by a suitable connector 30 below the tank. The drain line 28 includes a branched connector 32 coupled thereto which connects the drain line to a manual drain valve 34 at a first branch and to the inlet line 36 of a product flow pump 38 at a second branch. All of the connectors comprise suitable product flow connectors which plumb the lines of the system together while enabling flow of the liquid inoculant therethrough.

The pump 38 includes a 12 volt electrically operated motor which is controlled by a 12 volt toggle switch 40 which includes an inline fuse 42. A mounting bracket 44 supports the pump 38 below the tank 12 on the steel frame 20.

An outlet of the pump 38 is branched by a suitable branched connector 32 into a dispensing line 46 and an agitator line 48. The lines 46 and 48 are clear to permit product therein to be visibly observed. The dispensing line 46 is an elongate flexible hose having a wand 50 mounted at the free end thereof.

The wand 50 is an elongate rigid copper tube which includes a spray nozzle 52 at a free end thereof. A control valve 54 is located in line with the dispensing line 46 at the wand 50 for controlling the amount and rate that the liquid inoculant is dispensed through the wand 50. The nozzle 52 which dispenses the liquid inoculant from the wand 50 is arranged to spray the liquid therefrom in a fan-type pattern which is substantially planar.

The agitator line 48 is part of an agitator apparatus coupled to the tank 12 for recirculating inoculant in the tank through the pump and back to the tank. Periodic agitation of the liquid contents of the tank prevents settling and promotes uniform mixture of the product within the tank. The agitator line 48 is coupled at a free end to communicate with the top side 14 of the tank 12. A manual agitator valve 56 is coupled in series with the agitator line 48 for controlling the amount of liquid inoculant which is pumped through the agitator line 48 back into the tank 12. When agitation is not required, the agitator valve 56 is closed so that liquid pumped out of the outlet of the pump 38 is directed entirely to the dispensing line 46.

Figure 3:
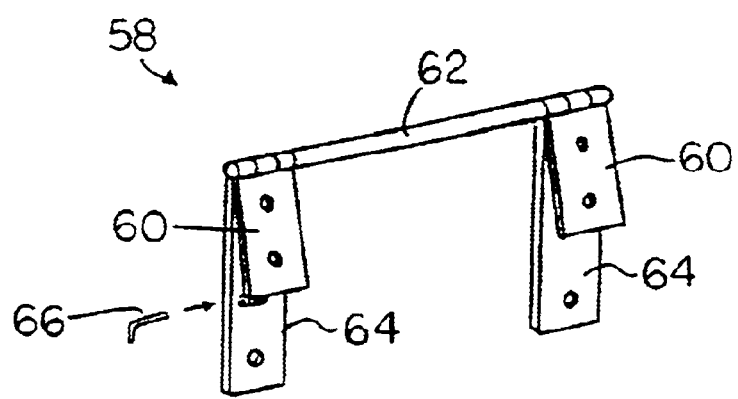
FIG. 3 is a view of a truck box mount hinge for the tank of FIG. 1.

As shown in FIG. 3, a mounting hinge 58 is illustrated for supporting the tank 12 on the supporting surface of a truck and the like, to keep the product within the tank level. The hinge 58 includes a pair of first plates 60 which are pivotal together about a rod 62 while being arranged for securement to the supporting surface of the truck using suitable fasteners. The hinge 58 further includes a pair of second plates 64 which are longer than the first plates and are pivotal about the rod 62 together in relation to the first plates 60. The second plates are arranged for securement to the steel frame 20 supporting the tank thereon such that the tank may be supported on the supporting surface for relative pivotal movement therebetween. A locking pin 66 is arranged to communicate with co-operating apertures in the first and second plates to selectively restrict relative rotation therebetween, thus restricting movement of the tank in relation to the supporting surface upon which it is mounted in a transport position of the system.

In actual operation, the seed treatment product is poured into the product tank 12 through the product fill hole in the top side 14. The product is transferred to the moving seed through a process of various control mechanisms.

The product pump is controlled by the on/off 12 volt toggle switch which is fused. The pump moves the product under pressure from the product tank through the lines and connectors by which the operator uses the control ball valve 54 to control the product amount exiting the spray nozzle 52.

When the seed treatment is done the operator flushes the apparatus with water. −40° C. washer fluid may be used to store apparatus to keep from freezing. Opening the drain valve 34 permits contents of the drain line and tank to be drained therethrough.

The electric supply is derived from conductor wires originating at the truck or seeders 12 volt supply.

This entire unit can also be converted for use as an ATV sprayer.

Figure 2:
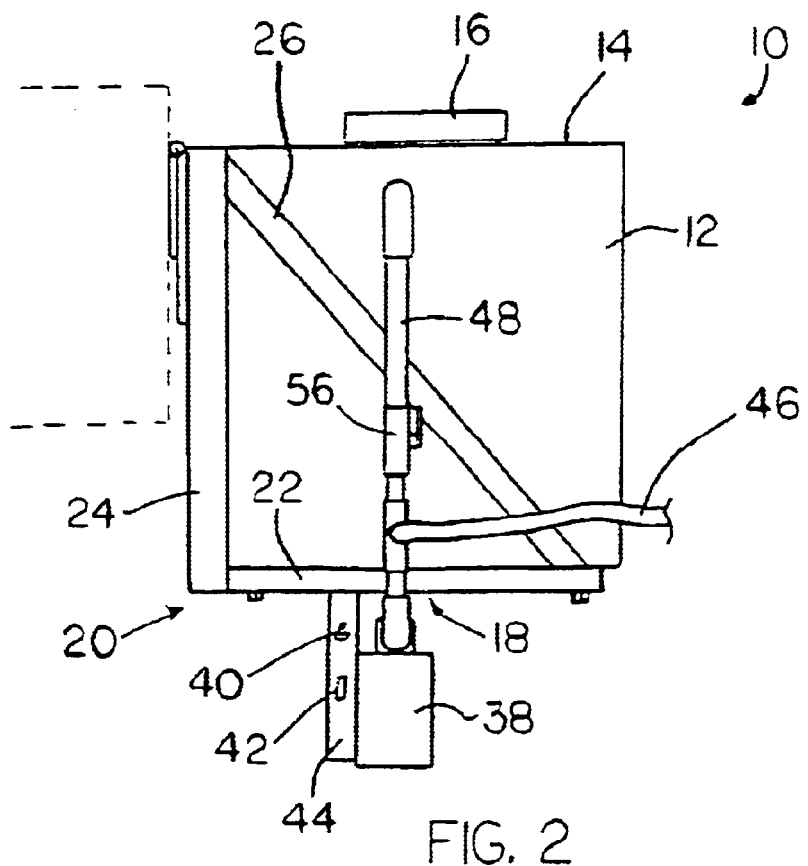
FIG. 2 is a side elevational view of the components of FIG. 1.
Figure 4:
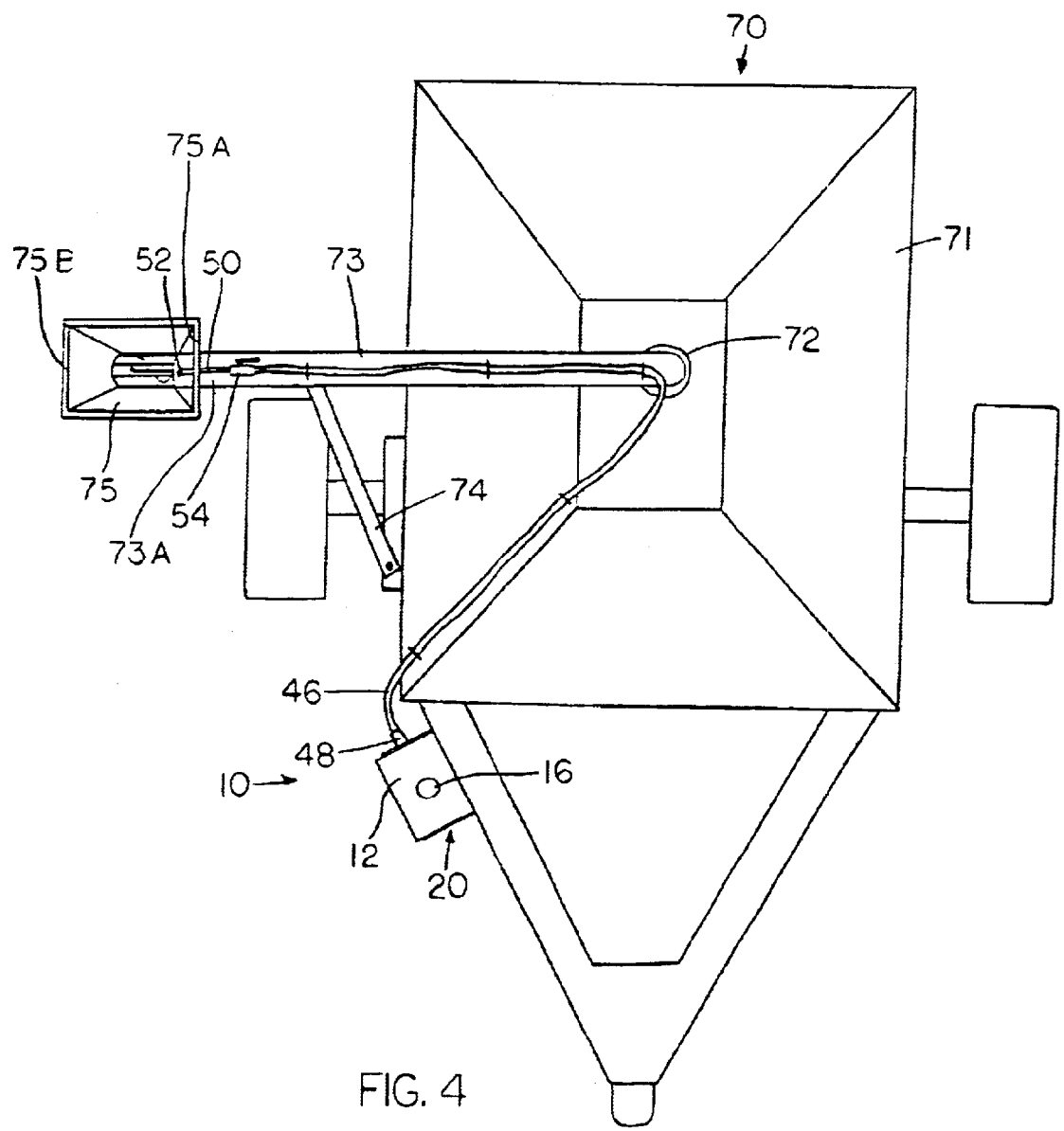
FIG. 4 is a schematic top plan view of the components of an air seeder cart including the components of FIG. 1.
Figure 5:
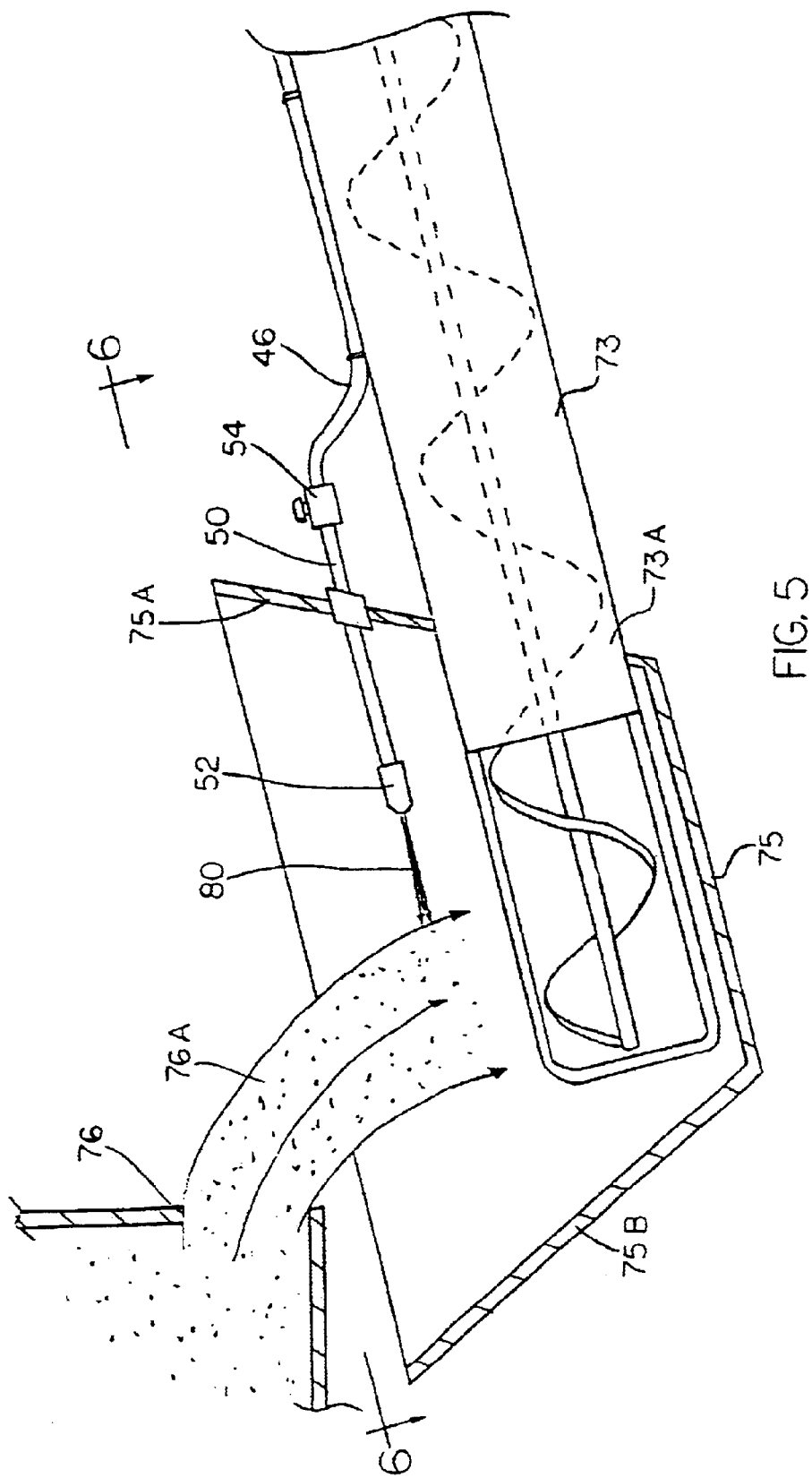
FIG. 5 is a vertical cross sectional view of the spray nozzle of FIG. 1 mounted on the auger hopper of FIG. 4.
Figure 6:
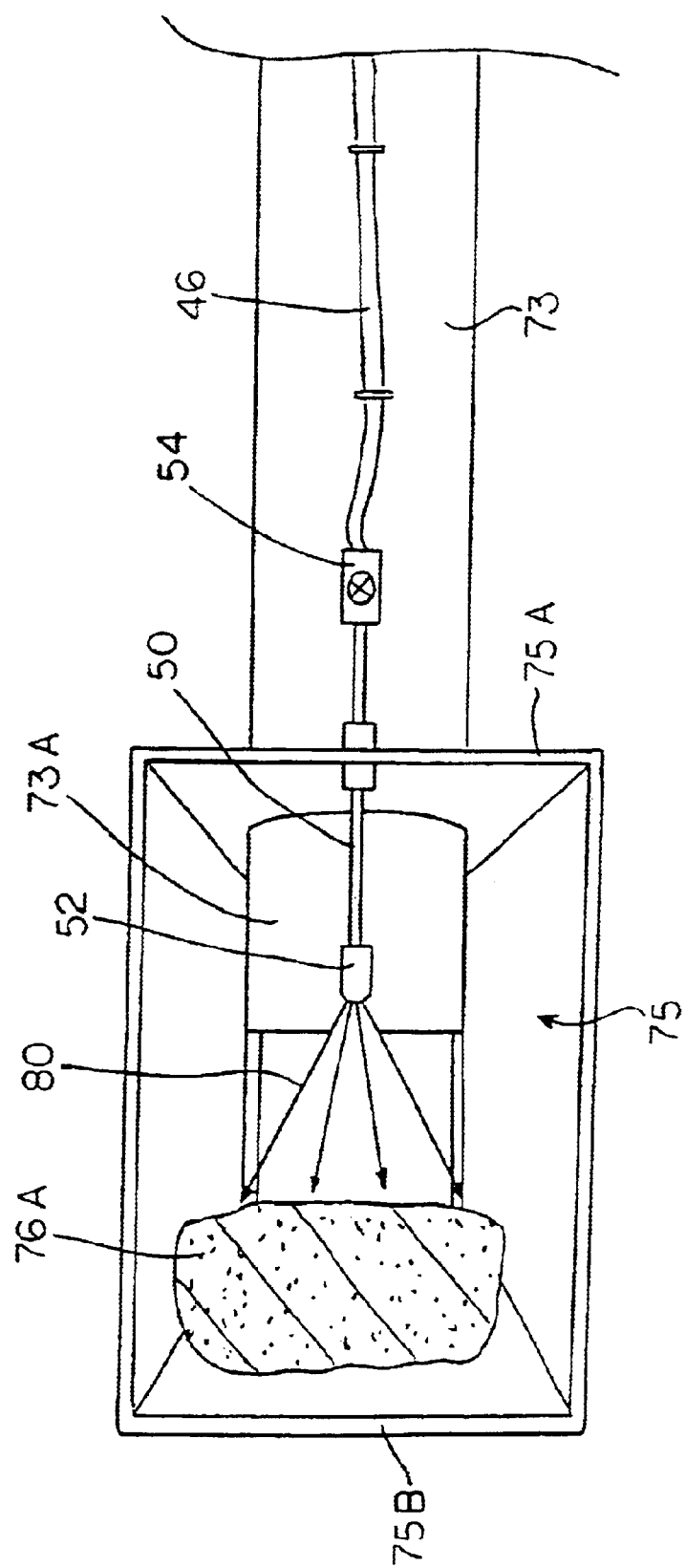
FIG. 6 is a top plan view along the line 6—6 of FIG. 5.

Turning now to FIGS. 4, 5 and 6 the same components as shown in FIGS. 1 and 2 are mounted directly on a seeder cart 70 for an air seeder which includes a seeder tank 71 with a filler opening 72. A filling auger 73 Is mounted upon a cantilever support 74 on the seeder cart. The support 74 is arranged to permit pivotal folding movement of the auger 73 in relation to the seed cart between a stored folded position alongside the cart and a filling position extending laterally outwardly from the cart so that a feed hopper 75 at a free end of the auger can be located underneath the discharge spout 76 of a supply truck arranged to transport seed. Accordingly, auger 73 acts as a transfer duct for loading seed into a seeder tank of the seeder cart as in a conventional seeder cart.

The seeder cart is well known to one skilled in the art and many examples are manufactured by different companies.

In the present arrangement, the seed treatment in liquid form is mounted in the supply tank 12 which is mounted on the frame of the cart at a suitable location using the mounting bracket arrangement of the frame 20 so that it remains permanently on the frame. Underneath the tank is the pump as shown previously which expels the liquid treatment material within the tank 12 through the flexible hose dispensing line 46 to the rigid wand portion 50 at the hopper 75. The flexible hose of the dispensing line 46 can accommodate the movement of the auger from the stored position alongside the tank 71 to the feed position as shown in FIG. 4.

As shown in FIG. 5 and FIG. 6, the auger 73 has a feed end 73A at the hopper 75. The hopper has a front wall 75A and a rear wall 75B together with side walls which confine the feed material from the discharge opening on the supply truck. The flexible portion of the hose is attached to the outside of the auger tube so that it remains with the auger tube at the feed end of the auger tube and is connected by a coupling to the rigid wand portion 50 which extends through the front wall 75A of the hopper. The one portion extends to the nozzle 52 which generates a fan shaped jet 80. The fan shaped jet is arranged to flow parallel to the shaft of the auger tube at a position spaced above the auger tube into the material entering the hopper. Thus the material from the discharge opening at the spout 76 of the truck is flowing downwardly as indicated at 76A into the hopper and the jet of the treatment liquid is generally at right angles to this flow lying in a plane parallel to the auger which is approximately horizontal so that the jet 80 of the liquid material enters into the flowing materials. The manually operable control valve 54 at the coupling between the dispensing line 46 and the wand 50 controls the flow through the wand 50 and the jet nozzle 52 so that the amount of the material injected into the stream of flowing seeds can be controlled manually to approximately match the quantity required depending upon the amount of flow at the discharge 76A.

In further embodiment, the wand may be arranged to discharge the liquid inoculant for treating the seeds directly into the flow of seeds through the auger. Alternatively, the wand may be mounted at the discharge end of the auger for spraying seed as it flows into the hopper 75 of the seed cart. Further variations include mounting the system on any type of implement arranged to convey seed by directing the wand to discharge the liquid inoculant into a flowing path of the seed.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A seed inoculation system comprising:
    a seeder having a seed tank and a plurality of seeding elements;
    a transfer duct comprising an auger tube for transporting the seeds from a supply to the seed tank;
    an inoculant tank supported on the seeder for receiving a liquid inoculant material;
    a pump for discharging the material from the tank;
    a rigid wand mounted on the transfer duct
    a hose communicating the inoculant material between the pump and the rigid wand;
    and a spray nozzle connected to an end of the wand and arranged to spray the material into a flowing mass of the seed to be inoculated at the transfer duct before entering the seed tank.

2. The system according to claim 1 wherein the duct includes a hopper and wherein the spray nozzle is mounted by the rigid wand so as to spray the material into the hopper.

3. The system according to claim 2 wherein the spray nozzle is mounted above the duct so as to spray the material into the seed as it enters the hopper.

4. The system according to claim 2 wherein the spray nozzle is arranged to spray in a fan pattern in a plane at right angles to the flow into the hopper.

5. The system according to claim 1 wherein the spray nozzle is mounted by the rigid wand so as to spray the material generally parallel to the duct.

6. The system according to claim 1 wherein the duct is mounted on the seeder for receiving the seed from a supply truck.

7. The system according to claim 6 wherein the hose is flexible so as to allow movement of the duct relative to the seed tank.

8. The system according to claim 6 wherein the inoculant tank is mounted on the seeder adjacent the seed tank.

* * * * *